United States Patent
Bellemare et al.

(10) Patent No.: US 6,915,037 B2
(45) Date of Patent: Jul. 5, 2005

(54) LOSSLESS OPTICAL DIVIDER/COMBINER WITH PUMP DIVERSION FOR SCALABLE OPTICAL NETWORKS

(75) Inventors: Antoine Bellemare, Sillery (CA); Habib Fathallah, Sainte-Foy (CA)

(73) Assignee: Accessphotonic Networks, Inc., Sainte-Foy (CA)

( * ) Notice: Subject to any disclaimer, the term of this patent is extended or adjusted under 35 U.S.C. 154(b) by 0 days.

(21) Appl. No.: 10/452,137

(22) Filed: Jun. 3, 2003

(65) Prior Publication Data

US 2004/0076371 A1 Apr. 22, 2004

Related U.S. Application Data

(60) Provisional application No. 60/384,416, filed on Jun. 3, 2002.

(51) Int. Cl.[7] ................................................ G02B 6/28
(52) U.S. Cl. .......................... 385/24; 385/27; 385/39; 359/341.32
(58) Field of Search ............................. 385/24, 27, 39; 359/337, 337.21, 341.32; 398/92

(56) References Cited

U.S. PATENT DOCUMENTS

| | | | |
|---|---|---|---|
| 5,321,707 A | 6/1994 | Huber | 372/6 |
| 5,323,474 A | 6/1994 | Hornung et al. | 385/24 |
| 5,608,571 A * | 3/1997 | Epworth et al. | 359/337.21 |
| 6,532,106 B2 * | 3/2003 | Chung et al. | 359/341.2 |

* cited by examiner

Primary Examiner—Frank G. Font
Assistant Examiner—Michael P. Mooney
(74) Attorney, Agent, or Firm—Baker & Hostetler LLP

(57) ABSTRACT

In this invention we present a method and apparatus of simultaneously compensating a divider power-loss and managing the pump's power budget in upgradeable and scalable passive optical network architecture. The apparatus namely called lossless splitter, is passive, bi-directional and allows modular and scalable PON architecture. According to the preferred embodiment of the present invention a mean of dividing (combining) optical signals to (from) a plurality of paths in a lossless fashion is proposed. This divider (combiner) also as the property of distributing the residual optical pump power, needed for amplifier stage activation, to other dividers (combiners) in a chain. The incoming pump power may be provided by the signal transmission fiber or by a pump power transmission fiber. Applications of this lossless divider (combiner) are reviewed, alternative embodiments are proposed and system deployment/upgrade strategies are described.

13 Claims, 3 Drawing Sheets

FIGURES

LOSSLESS OPTICAL DIVIDER/COMBINER WITH PUMP DIVERSION FOR SCALABLE OPTICAL NETWORKS

Priority claimed from U.S. patent application Ser. No. 60/138,416, filed Jun. 3, 2002.

FIELD OF THE INVENTION

The present invention relates to the field of passive components and modules for fiber passive optical networks, and more particularly concerns a lossless divider/combiner with partial pump diversion allowing pump power budget management capability.

BACKGROUND OF THE INVENTION

With the widespread growth of optical fiber telecommunications, networks are being used to distribute information between an increasing number of terminals (nodes). The increasing demand however presents a dilemma. On one hand, the number of divisions a given signal can go through while propagating through a network is limited by the minimal signal quality or power necessary at the terminal level. On the other hand, the number of terminals served by a network should be maximal to reach as many users as possible.

Presently, network capacity is generally increased through the provision of amplifiers throughout the network. However, amplifiers are active components and have many drawbacks, in that they demand electrical power supplies, they increase the probability of a breakdown in the network and necessitate regular maintenance, thereby requiring the frequent on-site involvement of qualified personnel. The use of active components therefore considerably increases the operation cost of the network.

In view of the above, the industry has been leaning towards the concept of Passive Optical Networks (PON), where active components are solely located at a central office and the general distribution network includes only passive elements.

An erbium-doped fiber amplifier (EDFA) includes active components, such as the pump, the electrical feed and the control electronics, and passive components, such as the doped fiber, the dividers, isolators and wavelength-division multiplexers (WDM). It is possible to separate the active and passive components while still performing the amplifying function. For example, the active elements may be placed in a central office and the pump sent along a network segment to a location where amplification is needed and where the passive elements are located. This technique, described in U.S. Pat. No. 5,321,707 (Huber), is referred to as "remote pumping".

When taking into account the energy transfer balance between the pump and the signal, a centralized amplification using a power amplifier or booster in the central office may give better results than distributed pumping. Centralized amplification however has its limitations. Firstly, the maximal power of signals injected in the fiber must be limited to avoid detrimental non-linear effects. Secondly, one must consider the often-unpredictable evolution of the network's characteristics, such as asymmetry between various branches, and increases in the size and number of users. In particular, this last factor necessitates a solution that allows a modular evolution of the network, independent of its size or architecture. With the often asymmetrical evolution of networks, where given branches may expand to include more ramifications than others, it is capital to have a solution that does compensate for losses independently of the state of the network.

SUMMARY OF THE INVENTION

It is an object of the present invention to provide a lossless optical divider/combiner with pump diversion for scalable optical networks. In accordance with the invention, this object is achieved with a lossless optical divider/combiner with pump diversion comprising:

a pump input having a divider for dividing a pump signal into a first and second pump signal;

a signal input for receiving a signal;

a distributed signal and pump outputs for outputting output signals;

a first light path between said signal input and said signal and pump outputs, said light path being provided with a gain medium;

a second light path between said pump input and said distributed signal and pump outputs;

at least one WDM for combining said signal input and said first pump signal into said first light path; and means for combining said signals of said first light path and said second light path and for outputting N distributed signal and pump outputs.

In accordance with another aspect of the invention, this object is achieved with a lossless optical divider/combiner with pump diversion comprising:

a pump input having a divider for dividing a pump signal into a first and second pump signal;

a signal input for receiving a signal;

a distributed signal and pump outputs for outputting output signals;

a first light path between said signal input and said signal and pump outputs;

a second light path between said pump input and said distributed signal and pump outputs;

at least one WDM for combining said signal input and said first pump signal into said first light path;

means for combining said signals of said first light path and said second light path and for outputting N distributed signal and pump outputs; and means for amplifying said signal.

DESCRIPTION OF PREFERRED EMBODIMENTS OF THE INVENTION

The present invention provides a modular passive lossless divider/combiner with pump diverting capabilities which is particularly well adapted for use in scalable optical networks. For simplicity, the device will hereinafter be referred to as a "divider" instead of the more accurate expression divider/combiner. Thus, it should be understood that the use of the expression "divider" includes the expression "combiner" in the context of the present invention.

Figure 1:
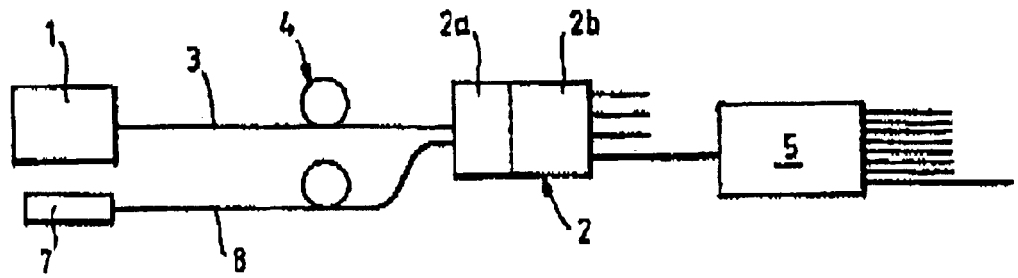
FIG. 1 (PRIOR ART) is a diagram of a device according to the prior art.

A divider according to prior art, described in U.S. Pat. No. 5,323,474 (Hornung et al.), is shown in FIG. 1. In that embodiment of the lossless splitter a few limitations are encountered. First, the remote pumping of the erbium-doped fiber is only accomplished via a fiber dedicated to the transmission of the pump power. It is proposed in the embodiments of the present invention that the pump power can be provided to the lossless splitter either by the signal fiber or by a pump power transmission fiber. When it is possible the pump power should preferably be transmitted along with the signals to limit fiber usage in the system.

Secondly, the apparatus proposed by Hornung et al. does not provide any pump power management capability. Thus, the system upgrade to more terminals by increased splitting is not explored and no solutions to this problem are proposed. In the embodiments of the present invention we present solutions to the system upgrade problem and show that system upgrade/modification can be performed without any downtime or modifications to the terminals and other equipment already in place.

To promote the upgradeability of a network system, dividers should be lossless and capable of being integrated into the network without any modification of the terminal, equipment, or any system downtime. For this to be possible, the net gain of the divider module must be unity (or very close to one) to maintain at the same level the decision threshold of the receptors. Additionally, a portion of the pump entering the module should be available at the exit, so that the following module may also be pumped. Ideally, each divider module should get an appropriate amount of the remote pump so that its gain is unity.

Figure 2:
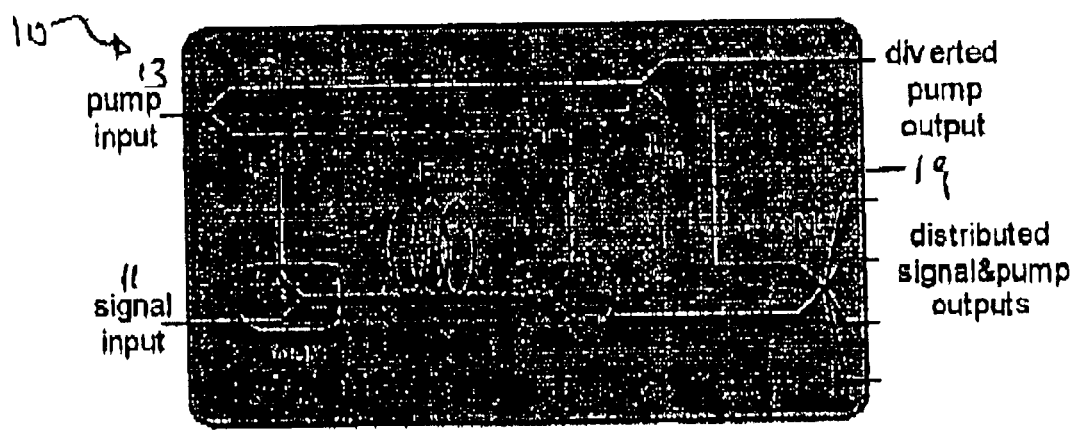
FIG. 2 is a diagram of a lossless divider/combiner with pump diversion according to a preferred embodiment of the invention.
Figure 5:
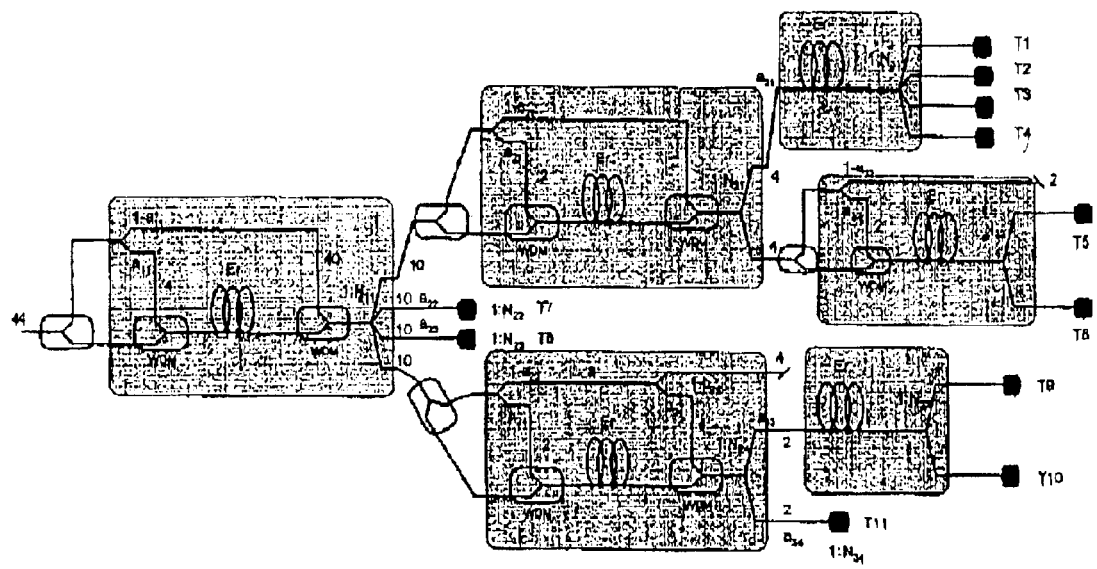
FIG. 5 is a diagram showing a cascade of dividers/combiners exemplifying the invention.

FIG. 2 shows a divider 10 according to a preferred embodiment of the invention. The divider 10 includes a first input 13 to receive the pump power and a second input 11 to receive the data signal. A gain medium 15, preferably an erbium-doped length of fiber, is provided on the path of the data signal. The pump power, preferably at a wavelength around 1.48 □m, is divided so that a portion $a_m$ is diverted to pump the gain medium 15, while a portion $(1-a_m)$ bypasses the gain medium 15. The $a_m$ pump power is introduced in the path of the Er-doped fiber through a WDM 17, which can be placed before the gain medium (forward pumping) or after the gain medium (backward pumping). Optionally, bi-directional pumping would be feasible with another WDM and additional splitting of the pump power portion $a_m$. Preferably, the portion $a_m$ of the pump power is chosen so that it is just sufficient to provide the desired population inversion in the gain medium, and that therefore minimal pump power is superposed to the amplified signal. No such pump power is present when backward pumping is used. With forward pumping, the remnant pump power, often negligible, can be used to pump the later divider modules in the chain and is usually not detrimental to the signal quality. The bypassed pump power is combined with the signal and then distributed to the succeeding divider modules via a 2×N splitter 19. It will be however recognized that the 2×N splitter can be replaced by a WDM and a 1×N splitter, as shown in FIG. 5.

In accordance with the principle of the invention, the amplified data signal is then divided into N components, each component being equal to the original data signal. In this manner the net effect of the divider is to provide N copies of the data signal, each copy being also superposed to a residual pump power, which may be used to pump the next divider. This configuration is independent of the propagation direction of the data signal. The device therefore acts as a combiner for upstream signals, as a divider for downstream traffic, or simultaneously in both directions.

Optionally, the residual or bypassed pump signal $(1-a_m)$ may be divided so that only a component $b_m$ is recombined with the amplified data signal and a component $(1-b_m)$ is provided at a separate output. This optional pump divider is particularly useful if the network is asymmetric as will be demonstrated in the practical example of FIG. 5.

Figure 3:
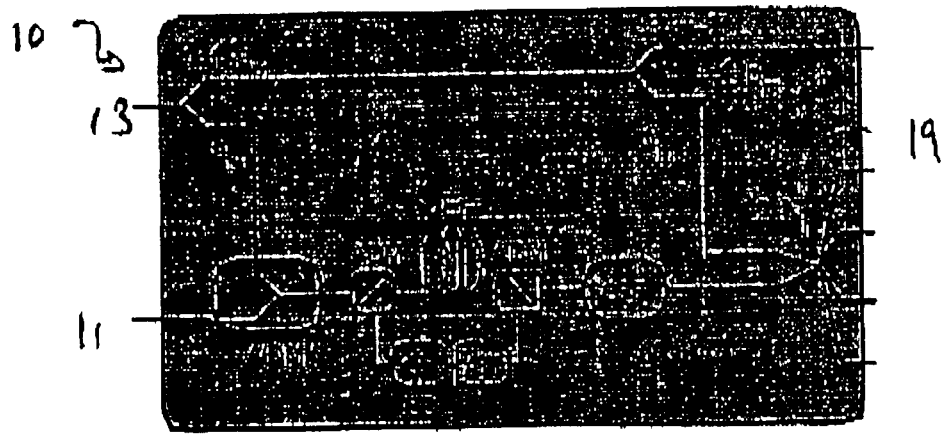
FIG. 3 shows a divider/combiner with pump diversion according to a further embodiment of the invention.

Referring to FIG. 3, there is shown yet another embodiment of the invention. With some added passive components, it is possible to spectrally equalize and temporally stabilize the loss compensation of the divider/combiner by adding passive optical components. A gain flattening filter (GFF) is provided after the gain medium and is used to spectrally equalize the gain curve. This GFF can also be made to reject some of the residual laser signal exiting from the feedback loop. A selective retroactive loop composed of two add/drop multiplexers (ADM), an (optional) optical isolator and a variable optical attenuator (VOA) is set between the input and output ports of the erbium-doped fiber (EDF). The function of this feedback loop is to temporally stabilize the gain by its laser action (see Zirngibl, U.S. Pat. No. 5,088,095). Since for a laser the gain at the lasing wavelength $(\lambda_m)$ is equal to the cavity loss and since the gain saturation in erbium is mostly homogeneous at room temperature (see for example E. Desurvire, *Erbium-doped fiber amplifiers: principles and applications*, John Wiley & Sons, New York, 770 p., 1994), we can adjust the gain at signal wavelengths by adjusting the cavity loss through an optical attenuator (ATT). Preferably, $\lambda_m$ is chosen outside of the range of the signals (either between about 1520–1525 nm or 1565–1570 nm if the signal are between about 1530–1560 nm) to be amplified and the optical isolator is oriented to favour co-propagation of the data and laser signals through the EDF.

Figure 4:
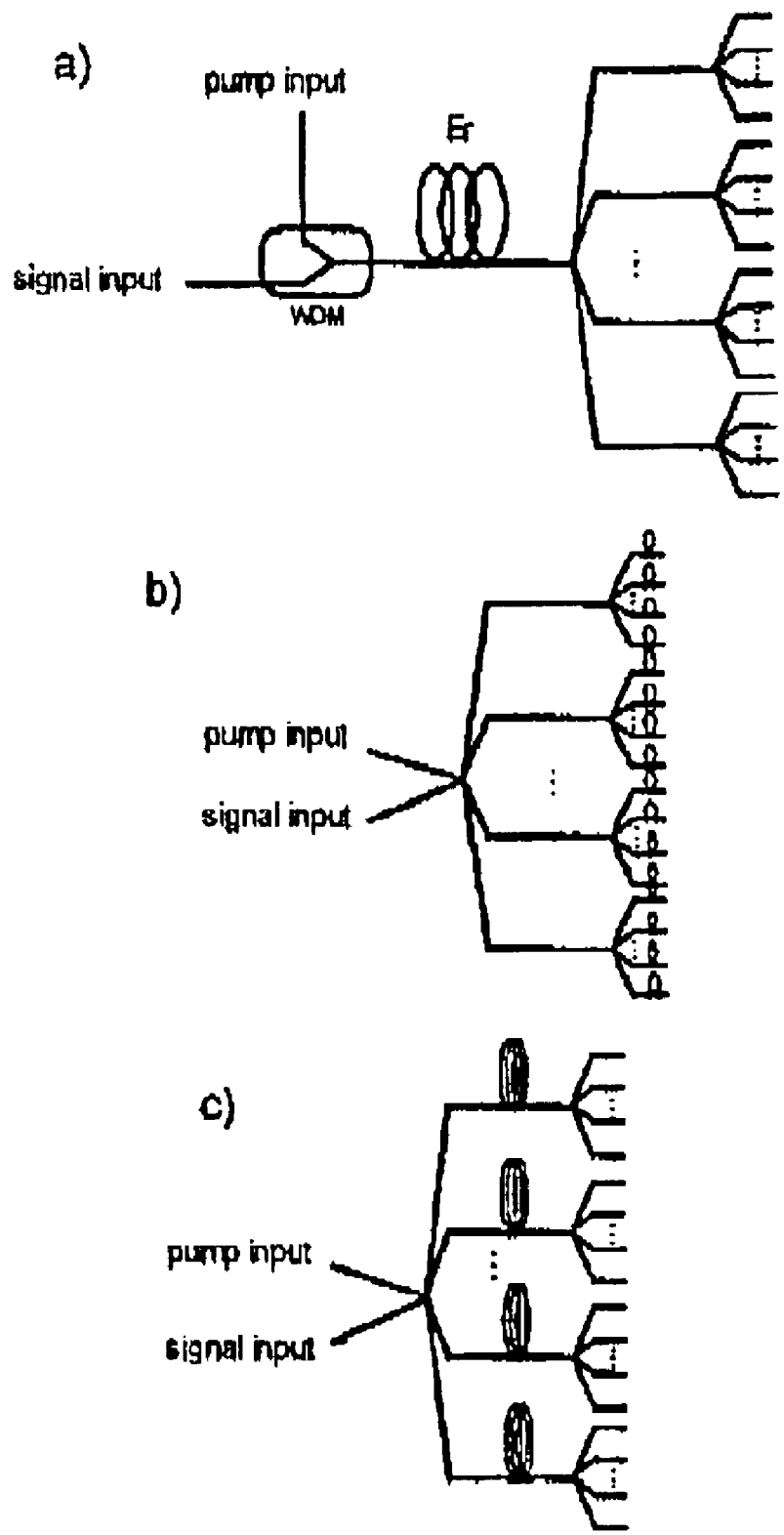
FIGS. 4A–C show different ways to perform the lossless signal division/combination function in further embodiments of the invention.

Referring to FIG. 4, there is shown different ways to perform the lossless signal division/combination function in further embodiments of the invention. Here we represent the tree different ways the erbium-doped fiber (EDF) can be placed in the divider (combiner). FIG. 4A shows the EDF before (after) the signal division (combination), this arrangement reduces the pump power and length of EDF required to amplify the signals. It is the preferred embodiment for dividing signals. However it may cause problems when combining low power signals, as the signals are further attenuated before being amplified which can result in poor optical signal-to-noise ratio (OSNR) and hence poor BER performance. To combine low power signals, the preferred embodiment is shown in FIG. 4B, where the EDF are placed before the combiner. However this set-up requires more pump power and EDF to obtain gains similar to the set-up of FIG. 4A. It is also the least effective set-up for a divider. A lower cost compromise to the set-up of FIG. 4B is presented in FIG. 4C, where the EDF is within the divider (combiner). In the end, the positioning of the EDF strands must be carefully studied in the case of low power signal division (combination) to obtain the required performance with the most economical set-up.

Referring back to FIG. 2, the coupling coefficients $a_m$ and $b_m$ of the pump dividers are determined based on the network's architecture. For a cascade of identical dividers $(N_1=N_2=\ldots=N_m=N)$, in first approximation it can be assumed that each gain module receives an equal amount of pump signal, and the coupling coefficients $a_m$ are determined by the number k of levels in the cascade and the number of outputs $N_m$ of each divider. Setting $b_m$ to 1, we have:

$$a_m = \frac{1}{1 + \sum_{i=m}^{k-1} \prod_{j=1}^{i} N_j}$$

The case $N_1 \neq N_2 \neq \ldots \neq N_m$ is more complex. Under the hypothesis of a linear operation situation (output power linearly proportional to pump power), the following equation may be derived for the coupling coefficients which, without being exact, is a good starting point for the network's design:

$$a_m = \frac{N_m}{\sum_{i=m}^{k-1} \prod_{j=1}^{i} N_j}$$

Finally, if the division is not the same for each branch n of a same level m, no simple relation can be found. The division rate of each divider downstream a given module must then be added up to obtain the pump power-coupling coefficient $a_m$ of this module. There is a practical limitation to be made to simplify the design of the network: its that all the dividers should be symmetric, that is, that if one level involves a division $N_{nm}$, the coupling rate in each port of this divider must be $1/N_{nm}$ which is usually the case for large port number commercial divider. With this limitation, some pump power may be temporary unused in the case of an asymmetric architecture.

Referring to FIG. 5, there is shown an example of such a cascade. In this case, by simple identification we find $N_{11}=4$, $N_{21}=2$, $N_{22}=1$, $N_{23}=1$, $N_{24}=2$, $N_{31}=4$, $N_{32}=2$ and $N_{34}=1$. Similarly, we have $a_{31}=a_{33}=a_{34}=1$. To compute the coefficient $a_{32}$, one must take into consideration the values of $N_{31}$, and $N_{32}$. Since the divider of the module (2,1) must be symmetric, a portion 2 NPU (normalized pump unit) provided to module (3,2) must be rejected to maintain the power levels at the outputs of this module, and therefore $a_{32}=0.5$. This pump power is however available for an additional 1×2 module added subsequently. Since the module (3,4) is simply a length of fiber joining the module (2,4) to terminal $T_{11}$, another 2 NPU is lost. For the coupling coefficient $a_{21}$, taking into consideration $N_{21}$ and the power to be provided to modules (3,1) and (3,2) we find $a_{31}=0.2$. By simple identification we find $a_{22}=1$ and $a_{23}=1$. Here again, 20 NPU are lost. For the module (2,4), we know that there are at least 10 NPU incident. Since 4 NPU are provided to modules (3,3) and (3,4) and $N_{24}=2$, then 6 NPU must be provided to module (2,4) and there is therefore 4 NPU which must be diverted to the exit of the module, giving a coupling coefficient of the output coupler of $b_{24}=0.5$. The coupling coefficient of the input coupler is $a_{24}=0.2$. Finally, for the module (1,1) we get $a_{11}=0.09$.

Adding up all the required pump power for the above system, we find that 44 NPU must be injected to obtain the required gain. Of this number, 28 NPU are temporarily unused, giving a pumping efficiency of 36%. This limited use of pump power is characteristic of asymmetrical networks, but it should be noted that this entire residual pump is still available for future additions to the network. This example is characteristic of a downstream upgraded network. Pump efficiency can be improved in the case of an upstream upgraded network as will be seen in FIG. 6.

Figure 6:
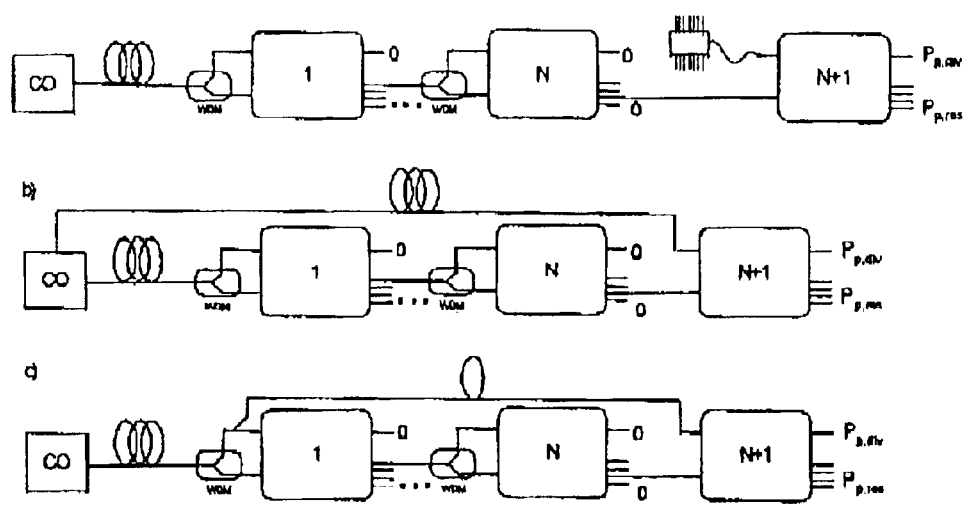
FIGS. 6A–C show different upgrade strategies for cascades of dividers/combiners.

Referring to FIG. 6, we show various network upgrade strategies that must be applied when all the pump power coming from the central office is used and there is no possible downstream upgrade. To add new users after that point, a new pump may be added, such as shown in FIG. 6A. However, this would violate the passive optical network criteria. Also pump power may come from a pump distribution fiber as proposed in U.S. Pat. No. 5,321,707 and illustrated in FIG. 6B. Thus, the module suggested here may equally be used in a system where the pump and data signals propagate in the same fiber, in different fibers or in hybrid architecture. The present invention is also highly adaptable in that it is possible to upgrade the system from upstream or downstream as shown in the example of FIG. 5 and from upstream as pictured in FIG. 6C. It is possible to upgrade the system from upstream by tapping some of the pump power at a point between the WDM and the first (most upstream) module of the cascade and increasing the pump power accordingly. This new module uses a portion of the pump power and diverts the same amount of pump power as before to the rest of the cascade. For downstream upgrade (see FIG. 5) two scenarios are possible. If residual pump is available at each output port of the 1×N coupler ($b_m=1$), the upgrade is said to be symmetric and N cascades may be pumped. If residual pump is available at the pump output only ($b_m=0$), a single cascade may be pumped and the upgrade is said asymmetric. Whenever possible, upstream upgrade should be favoured over downstream upgrade for the sake of higher pump efficiency. However, the upstream upgrade strategy suffers from a generalized down time for all terminals when upgrades are made whereas no (or partial) down time is possible for the downstream upgrade strategy. Also the upstream upgrade strategy may, in some instances, require more fiber than the downstream upgrade strategy. On the other hand downstream upgrade strategy is ultimately limited to the pump power initially provided to the network whereas the upstream upgrade strategy has unlimited upgradeability.

Of course numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention.

What is claimed is:

1. A lossless optical divider/combiner with pump diversion comprising:

a pump input having a divider for dividing a pump signal into a first and second pump signal;

a signal input for receiving a signal;

a distributed signal and pump outputs for outputting output signals;

a first light path between said signal input and said signal and pump outputs, said light path being provided with a gain medium;

a second light path between said pump input and said distributed signal and pump outputs, said second light path including a divider for dividing said second pump signal into a pump output and a diverted pump output;

at least one WDM for combining said signal input and said first pump signal into said first light path; and means for combining said signals of said first light path and said second light path and for outputting N distributed signal and pump outputs.

2. A lossless optical divider/combiner according to claim 1, wherein said gain medium is an Erbium-doped length of optical fiber.

3. A lossless optical divider/combiner according to claim 1, wherein said divider/combiner is forward pumped.

4. A lossless optical divider/combiner according to claim 1, wherein said divider/combiner is backward pumped.

5. A lossless optical divider/combiner according to claim 3, wherein said divider/combiner further includes means for spectrally equalizing and temporally stabilizing the loss compensation.

6. A lossless optical divider/combiner according to claim 5, wherein said means for spectrally equalizing and temporally stabilizing include:
- a gain flattening filter provided between the gain medium and said distributed signal and pump outputs;
- a selective retroactive loop composed of two add/drop multiplexers located on either side of said gain medium and an optical isolator and a variable optical attenuator.

7. A lossless optical divider/combiner according to claim 1, wherein said means for combing and splitting include a 2×N splitter.

8. A lossless optical divider/combiner according to claim 1, wherein said means for combining and splitter include a WDM and a 2×N splitter.

9. A lossless optical divider/combiner with pump diversion comprising:
- a pump input having a divider for dividing a pump signal into a first and second pump signal;
- a signal input for receiving a signal;
- a distributed signal and pump outputs for outputting output signals;
- a first light path between said signal input and said signal and pump outputs;
- a second light path between said pump input and said distributed signal and pump outputs, said second light path including a divider for dividing said second pump signal into a pump output and a diverted pump output;
- at least one WDM for combining said signal input and said first pump signal into said first light path;
- means for combining said signals of said first light path and said second light path and for outputting N distributed signal and pump outputs; and
- means for amplifying said signal.

10. A lossless optical divider/combiner according to claim 9, wherein said means for amplifying said signal are located between said WDM and said means for combining and splitting.

11. A lossless optical divider/combiner according to claim 9, wherein said means for amplifying are located in each branch of said N distributed signal and pump outputs.

12. A lossless optical divider/combiner according to claim 9, wherein said means for amplifying are located within said means for combining and splitting.

13. An optical network comprising a plurality of lossless optical divider/combiner according to claim 1 cascaded together.

* * * * *